United States Patent [19]
Niedrig

[11] Patent Number: 4,871,414
[45] Date of Patent: Oct. 3, 1989

[54] APPARATUS FOR CONNECTING OVERLAPPING ENDS OF THERMOPLASTIC BAND MATERIAL

[75] Inventor: Franklin F. Niedrig, Berikon, Switzerland

[73] Assignee: Strapex AG, Wohlen, Switzerland

[21] Appl. No.: 812,441

[22] Filed: Dec. 23, 1985

[30] Foreign Application Priority Data

Dec. 27, 1984 [CH] Switzerland ............... 6183/84

[51] Int. Cl.⁴ .................. B65B 13/32; B32B 31/18
[52] U.S. Cl. ................... 156/494; 100/33 PB; 156/530; 156/579; 156/580
[58] Field of Search .............. 156/580, 494, 73.5, 156/502, 530, 579; 100/33 PB; 53/399, 592

[56] References Cited

U.S. PATENT DOCUMENTS

| 3,554,845 | 1/1971 | Billett | 156/580 |
| 3,799,835 | 3/1974 | Gilmore | 156/580 |
| 4,001,064 | 1/1977 | Nix | 156/580 |
| 4,227,949 | 10/1980 | Wehr | 156/580 |
| 4,305,774 | 12/1981 | Wedeking | 156/580 |
| 4,595,433 | 6/1986 | Ford | 100/33 PB |
| 4,605,456 | 8/1986 | Annis | 156/157 |

FOREIGN PATENT DOCUMENTS 2372733  6/1978  France .

Primary Examiner—George F. Lesmes
Assistant Examiner—J. Davis
Attorney, Agent, or Firm—Werner W. Kleeman

[57] ABSTRACT

A band or strap of thermoplastic material which has been placed around a package or article being wrapped is put under tension by means of a tensioning device. The connection apparatus for connecting overlapping ends of the thermoplastic band material is placed within the area of the band or strap under tension and is used to connect these overlapping ends together. The connection apparatus welds the overlapping ends of the strap together using friction by rubbing the lowermost end in a transverse direction with repsect to the longitudinal axis of the band or strap against the uppermost strap end by means of a vibrating or oscillating welding jaw. The welding jaw is driven by an internal battery-powered DC-motor. The connection apparatus is especially well suited for use with a separate tensioning device and can be used in lieu of previously used seal clamps or pliers, independent from a connection with an electric power network or a source of compressed air.

8 Claims, 2 Drawing Sheets

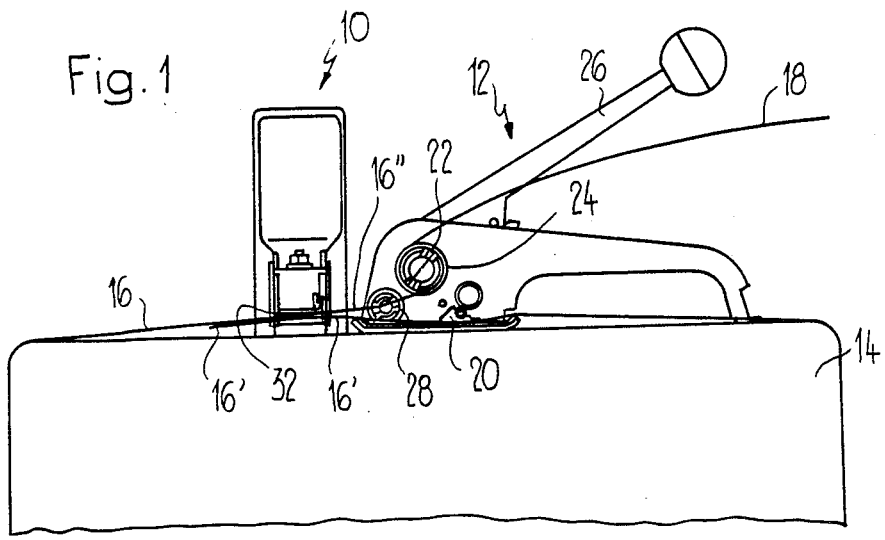
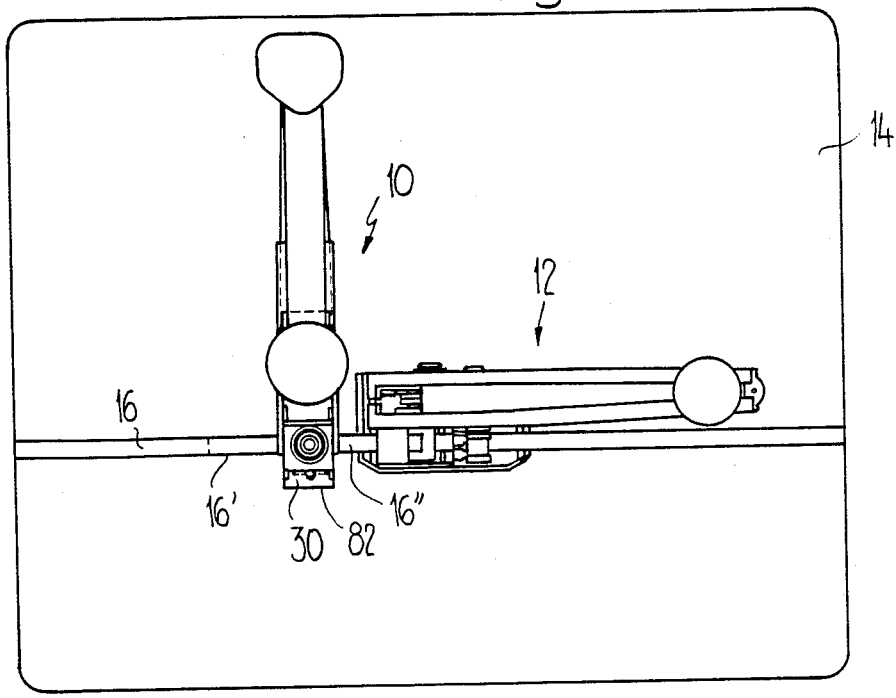

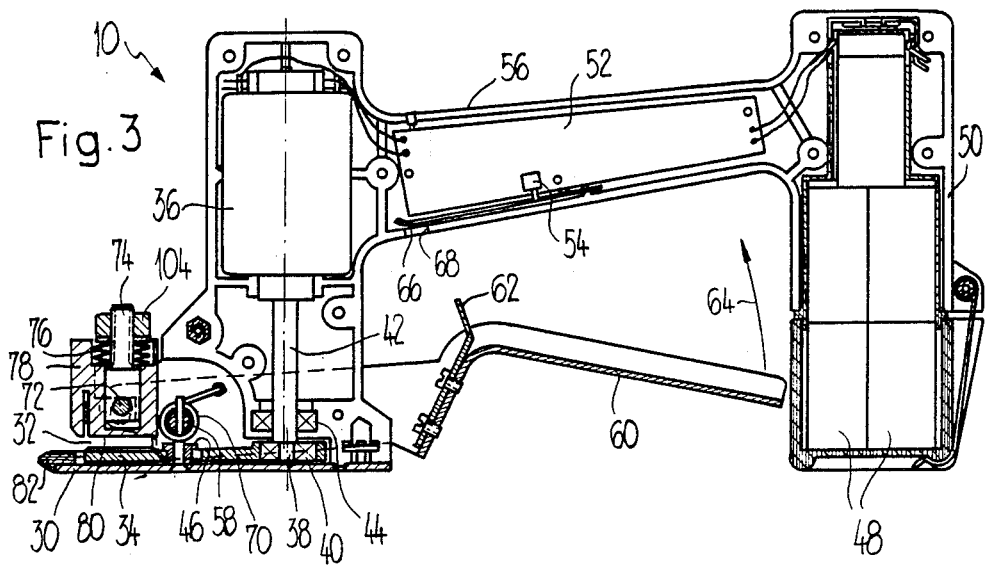
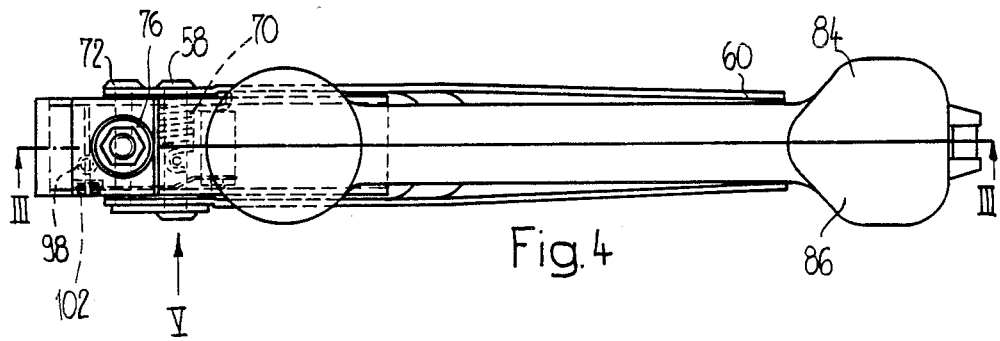
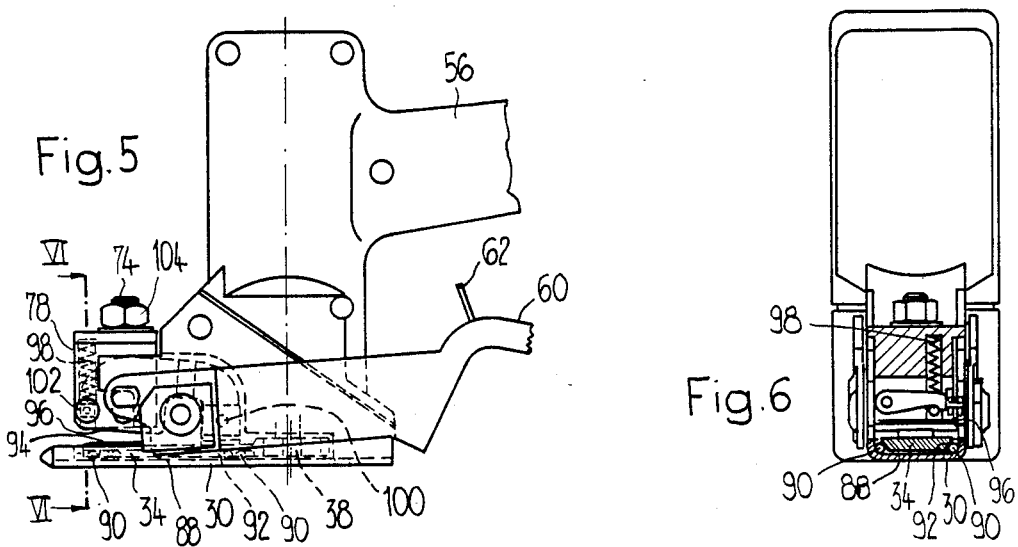

APPARATUS FOR CONNECTING OVERLAPPING ENDS OF THERMOPLASTIC BAND MATERIAL

CROSS REFERENCE TO RELATED APPLICATION

This application is related to the commonly assigned, copending U.S. application Ser. No. 06/ 819,581, filed Jan. 17, 1986, and entitled "Tensioning And Connecting Apparatus For Connecting Overlapping Strap Ends of Synthetic Material".

BACKGROUND OF THE INVENTION

The present invention broadly relates to an apparatus for connecting overlapping ends of thermoplastic band material or straps which have been stretched or tensioned around at least one package or article being wrapped by means of a separate tensioning device.

In its more particular aspects, the connection apparatus of the present invention comprises a base plate serving as a base or support for the apparatus on the package or article being wrapped. A predetermined gap is situated above the base plate and serves to accommodate the overlapping strap or band ends. Adjoining this predetermined gap are a welding jaw for frictional welding which is driven or actuated with a backward-and-forward motion or to-and-fro oscillation in a direction substantially transverse to the direction of the band or strap and a clamping surface situated opposite to this welding jaw.

Such an apparatus serves, together with a separate tensioning device, to wrap a package or article being wrapped or a number of articles which are to be wrapped. The tensioning device normally comprises a slotted wheel serving as the tension-producing or tensioning element. The uppermost end of the two overlapping ends of the band or strap is inserted into the slot of the slotted wheel and tensioned by turning or rotating the slotted wheel. In order to connect both strap or band ends together, the apparatus, with its slot opened laterally, is placed on a package or article being wrapped and moved laterally until both strap ends overlap one another in the slot. The connection of these overlapping strap or band ends is made by a frictional weld, whereby both ends are rubbed against one another until they fuse.

A known apparatus of the initially discussed type, as disclosed in British Pat. No. 2,055,685, published Mar. 11, 1981, is composed of a lower fixed or stationary welding jaw and an upper vibrating or to-and-fro oscillatingly driven friction jaw. The lower fixed welding jaw is formed by the base plate of the apparatus. To weld using this known apparatus, the upper welding jaw, which is pivotably mounted about an axis extending perpendicular to the plane of the welding jaws, is driven or actuated by an eccentric mechanism or cam. The shaft of this eccentric mechanism or cam is disposed substantially parallel to the plane of the welding jaws. With this arrangement the upper welding jaw engages with the uppermost strap or band end in order to vibrate or to move it back-and-forth in a direction substantially transverse relative to the lowermost strap or band end.

Actuation or drive problems are not encountered as long as sufficient power is available to actuate such an apparatus, for example, when power is supplied from an electric power supply network. In case such an apparatus is to be constructed, however, as a portable or hand-held unit, the dependence of its connection to a socket or outlet of an electric power supply network is a disadvantage. Although it is possible to dimension the drive mechanism of such an apparatus for battery operation by building a correspondingly large battery into the apparatus, the apparatus then becomes heavy and unwieldy so that the advantage with respect to an apparatus operated from an electric power supply network is at least partially lost.

Other known constructions of such type of equipment are exemplified by German Pat. No. 1,924,061, granted Jan. 7, 1971; German Pat. No. 1,704,048, granted Mar. 2, 1972; Swiss patent No. 494,632, granted Sept. 30, 1970; German Published Pat. No. 2,802,034, published June 13, 1979; French Published Pat. No. 2,122,891, granted Sept. 1, 1974; German patent publication No. 3,200,951, published Apr. 14, 1983, and Swiss Pat. No. 637,587, granted Aug. 15,1983.

SUMMARY OF THE INVENTION

Therefore, with the foregoing in mind, it is a primary object of the present invention to provide a new and improved construction of an apparatus for connecting overlapping ends of thermoplastic band or strap material which does not exhibit the aforementioned drawbacks and shortcomings of the prior art constructions.

Another and more specific object of the present invention aims at providing a new and improved construction of an apparatus of the previously mentioned type for connecting overlapping ends of thermoplastic band or strap material and which apparatus exhibits a size and a weight particularly suitable to easy portable battery operation.

Yet a further significant object of the present invention aims at providing a new and improved construction of an apparatus of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the apparatus of the present invention is manifested by the features that the welding jaw is positioned or mounted in the vicinity of the base plate, and such welding jaw has a clamping or gripping face or surface which faces upwards and acts upon the lowermost strap or band end.

The power requirements for actuating and driving such an apparatus are surprisingly and significantly less than for the known apparatus. This is due to the fact that the welding jaw moves the lowermost strap or band end which, unlike the uppermost strap or band end, is not under tension from the tensioning device, but is totally free to move. The lowermost strap end is moved relative to the uppermost strap end, which is subject to the action of the tensioning device so that the weld connection nevertheless occurs in the area under tension. It is usual that, after the weld or weld connection solidifies, a severance or cut is made between the weld-point or location and the engagement point of the tensioning device on the uppermost strap or band end. As a result of the reduced power requirements compared with prior art constructions, it is thus possible to design a handy and relatively lightweight battery-operated apparatus.

A preferred embodiment contemplates that the base plate possesses a guide channel that extends transverse to the direction of the strap and which accommodates the welding jaw. The welding jaw is thus particularly well supported or stably mounted and suitable to absorb lateral forces, i.e. forces acting in the direction of the strap.

According to a further preferred embodiment the welding jaw is supported in the guide channel on rolling or anti-friction members. The frictional resistance between the welding jaw and the guide channel is thereby reduced to a minimum. Such an embodiment is also particularly suited to taking-up large pressure or compression forces without appreciable wear. The rolling members can be either rollers or balls.

A further contemplated embodiment has the rolling members positioned in each of the two longitudinal edges of the welding jaw and at least partially embedded in longitudinal grooves in the welding jaw. The rolling members may be comprised of two rows of balls. The insertion of the balls in longitudinal grooves located at the edges of the welding jaw results in a guide arrangement which is capable not only of withstanding pressure or compressive forces, but which is also capable of withstanding lateral shearing forces.

The welding jaw may be coupled to an eccentric mechanism or cam whose shaft lies perpendicular to the plane of the welding jaw in order to connect the welding jaw to a driving or drive element. The perpendicular positioning of the shaft of the eccentric mechanism or cam to the welding jaw results in that only a few transmission elements are necessary, ideally only one bearing between the eccentric mechanism or cam and the welding jaw.

The shaft of the eccentric mechanism or cam can be coupled to a DC-motor which is connectable to a predetermined number of batteries or a battery pack or unit contained within the housing of the apparatus. Operation of the apparatus at any desired location or site is thus possible, independent from any connection with an electric power supply network or with a compressed-air source.

The clamping face or surface positioned opposite to the welding jaw may be attached to a clamping punch, which can be depressed or lowered against the force of a return spring by using an actuation lever. This has the advantage that, rather than the welding jaw, the clamping face or surface located opposite to the welding jaw and used to clamp or hold down the strap ends, is movable.

The clamping punch may be resiliently arranged or supported by using a plate or cup spring. The clamping force exerted on the ends of the strap is only dependent on the plate or cup spring if the actuation lever comes into contact with a stop at the end of its path of movement. In such a way it is ensured, independent of the force applied by the operating person, that a uniformly constant clamping force is exerted on the strap ends. It is also possible, naturally, to set the clamping force desired by adjustment means.

The actuation lever can be provided with means for tripping a switch for actuating the DC-motor and which means are so arranged that the DC-motor is actuated before the strap ends are pressed together by the clamping punch. The DC-motor and the welding jaw are thus switched on without additional actuation means by operating the actuation lever before the full clamping force is effectively applied to the strap ends. Actuating or starting-up the DC-motor before the full clamping force is achieved has the advantage that the DC-motor and the batteries can be designed for a smaller power output than would be permitted if the DC-motor actuated the welding jaw after the greatest clamping force was achieved.

There also may be provided a switch to interrupt the electric current flowing through the current circuit of the DC-motor and for counting the number of vibrations or to-and-fro oscillating movements of the welding jaw. Thus, deactuation of the DC-motor is a function of its number of rotations so that, independent of the operating person, continuous uniform welds or weld connections are possible. Deactuation of the DC-motor before release of the clamped connection is necessary, however, in order to allow for a cooling time to ensure that the weld connection has set or solidified and will hold.

It is also contemplated to provide a cutter or knife to sever the uppermost strap end and which cutter is coupled in such a manner with such welding jaw that it operates synchronously with such welding jaw and is driven with the same stroke. The connection apparatus for connecting the overlapping ends of thermoplastic band or strap material thus also simultaneously serves to cut or sever the strap or band from its supply roll or supply means. No additional driving means is necessary for the cutter or knife, which is actuated simultaneously with the welding jaw, and furthermore, the severance or cut occurs automatically. The synchronous movement and identical stroke of the cutter or knife relative to the welding jaw prevents, at the lowermost welding jaw, that the lowermost strap end will be damaged either by the cutter or knife after severance of the uppermost strap end as no relative motion takes place between the cutter or knife and the lowermost end which is actuated by the welding jaw.

The cutter or knife is biased or loaded in the direction of the uppermost strap end to be cut and is coupled together with the clamping punch in such a way that they can be lowered simultaneously. Actuation of the cutter or knife is achieved by moving the actuation lever so that the cutting procedure does not have to be especially followed by the operating person.

The invention further contemplates that the actuation lever and a substantially parallel handle or handgrip extend perpendicular to the direction of extent of the strap or band. The apparatus is thus capable of being placed transverse to the direction of the strap in the immediate vicinity of the tensioning device in a like manner as a seal clamp or pliers would be placed.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various FIGURES of the drawings there have been generally used the same reference characters to denote the same or analogous components and wherein:

FIG. 1 shows a side view of an illustrative embodiment of connection apparatus for connecting the ends of a wrapping band or strap in combination with a separate tensioning device, both placed on a package or article being wrapped;

FIG. 2 shows a top plan view of the same illustrative embodiment as shown in FIG. 1;

FIG. 3 shows a longitudinal sectional view of the connection apparatus along the lines III—III of FIG. 4;

FIG. 4 shows a top plan view of the connection apparatus shown in FIG. 3;

FIG. 5 shows a side view of the connection apparatus of FIG. 4 as seen in the direction of the arrow V; and FIG. 6 shows a sectional view of the connection apparatus along the lines VI—VI of FIG. 5.

DETAILED DESCRIPTION OF THE PREFERRED EMBODIMENTS

Describing now the drawings, it is to be understood that to simplify the showing thereof, only enough of the structure of the connection apparatus and tensioning device have been illustrated therein as is needed to enable one skilled in the art to readily understand the underlying principles and concepts of the present invention. Turning now specifically to FIG. 1 of the drawings, the arrangement illustrated therein by way of example and not limitation, will be seen to comprise an apparatus 10 for connecting overlapping strap or band ends of thermoplastic band material and a tensioning device 12 set upon a package or article 14 to be wrapped. Around the package or article 14 to be wrapped, there is placed the strap or band 16 of thermoplastic band material. The innermost end 16' of the strap 16 is overlapped by the outermost or uppermost end 16" of the strap 16 over a predetermined distance. In the illustrated embodiment of FIG. 1, the outermost end 16" is still connected by way of the section 18 of the strap to a not particularly shown supply roll.

The tensioning device 12 is composed of the clamping element 20 to hold the innermost strap end 16' in place. The outermost strap end 16" is placed in a slot 22 of a slotted wheel 24 and tension is applied by a turning or rotational motion of the slotted wheel 24 in a counterclockwise direction. To apply tension, a hand lever 26 is actuated. The tensioning device 12 furthermore possesses a severing or cutting device 28 which, however, is not necessary in this case as the connection apparatus 10 is provided with the cutter or knife 96, as will b described in the following. The severing or cutting device 28 of the tensioning device 12, on the other seal connections.

From FIG. 2 it can be seen that the connection apparatus 10 as illustrated for operation, lies perpendicular to the direction of the strap 16 and is composed of a base plate 30 to provide support when placed upon the package or article 14 to be wrapped. Above the base plate 30, there is a predetermined or particular gap 32 (FIG. 1) used to receive outermost strap end or section 16". The perpendicular arrangement of the connection apparatus 10 to the tensioning device 12 is necessary for space reasons in order to produce a weld of the spot under tension as close as possible in the area under tension.

In FIG. 3, the connection apparatus 10 used to produce frictional welds, is composed of the welding jaw 34 positioned above the base plate 30. This welding jaw 34 is oscillatingly driven back-and-forth transverse to the direction of the strap 16. The driving element or drive for the welding jaw 34 is the DC-motor 36, which is coupled to the welding jaw 34 via the eccentric mechanism or cam 38 by means of the grooved ball bearing 40. A shaft 42 of the eccentric mechanism or cam 38 which is connected to the DC-motor 36 is also situated in a further grooved ball bearing 44. A guide bushing 46 serves to control the vertical or elevational guidance of the welding jaw 34.

A plurality of single-celled batteries 48, constituting a battery power supply, are used for supplying electrical energy to the DC-motor 36 and are situated in a battery compartment or housing part 50 located at a predetermined distance from the DC-motor 36. Actuation of the DC-motor 36 is accomplished by an actuation switch 54 located on a conductor board or plate 52. The conductor board or plate 52 is situated in a housing or casing part 56 constructed as a handle and contains the switching elements or circuit components of a control switching arrangement used to deactivate the DC-motor 36 in a time-dependent manner. Opposite the handle-like housing or casing part 56 lies an actuation or clamping lever 60 which is pivotable around a pivot axis or shaft 58. The clamping lever 60 contains a tripping or actuation element or angled member or pin 62 to actuate or trip the actuation switch 54 by way of a flat or leaf spring 66 during actuation of the clamping lever 60 in the direction of movement indicated by the arrow 64. The tripping or actuation element 62 penetrates into a recess or opening 68 situated in the middle portion or handle-like casing or housing part 56. A torsion spring 70 clamping lever 60.

The short or shortest arm of the clamping lever 60 is connected to a clamping punch or stamp 78 by means of an axle bolt 72, a bolt 74 and a plate or cup spring 76. The clamping punch or stamp 78 possesses a clamping surface or face 80 located adjacent to the gap 32 and situated opposite to the welding jaw 34. A key head or wedged-shaped nose 82 is connected to the furthest end of the base plate 30 which serves to also admit the overlapping strap ends.

From FIG. 4 it can be seen that the housing or casing of the connection apparatus 10, also to which belong the housing or casing part 56 and the battery-containing housing or casing part 50, are composed of the two halves 84 and 86. Furthermore, it can be seen that the clamping lever 60 in its cross-section is substantially U-shaped.

From FIGS. 5 and 6 it can be ascertained that the base plate 30 is in its cross-section substantially U-shaped in order to form a guide channel 88 for the welding jaw 34 which is supported therein on balls 90. A row of balls 90 is positioned on each of both longitudinal edges of the welding jaw 34. The balls 90 are thereby at least partially admitted or embedded into longitudinal grooves 92 provided in the welding jaw 34. Although only the first and last ball of each row of the balls 90 are illustrated in FIG. 5, the entire row between these two illustrated balls 90 is filled with balls. By way of the arrangement described for the balls 90, the welding jaw 34 located in the guide channel 88 is not only capable of bearing vertical forces, e.g. forces acting from above, but also is capable of bearing lateral forces. The welding jaw 34 is loaded by lateral forces when it must take-up at least a portion of the tension in the strap or band 16.

The welding jaw 34 possesses a gripping surface 94 oriented or directed upwards in order to securely grip or engage the innermost strap end 16', shown in FIG. 1, in such a manner that it will be rubbed backwards and forwards by the to-and-fro oscillatingly driven welding jaw 34 against the outermost strap end 16" (FIG. 1) for producing the frictional weld.

A cutter or knife 96 is connected to the welding jaw 34 by means of a bolt or pivot 100. By means of this coupling, the cutter or knife 96, which is used to sever or cut the outermost strap end 16" as shown in FIG. 1, is driven with the same stroke and is thus driven synchronous to the movement of the welding jaw 34. The cutter or knife 96 is arranged to be pivotable around the bolt 100 so that it can be lowered onto and withdrawn or removed from the outermost strap end 16" to be severed or cut. The lowering and raising occurs coincident with the clamping punch or stamp 78 to which it is coupled by means of a roller 102 used for entrainment at its end located opposite of the pivot axis or bolt 100. The cutter or knife 96 is pre-biased in the direction of the outermost strap end 16" to be severed by a pressure or compression spring 98 which is located in the clamping punch or stamp 78.

The conductor board or plate 52 of the control switching arrangement, as illustrated in FIG. 3, possesses a not particularly shown switching element of an oscillation or vibration counter in order to limit the number of oscillations or vibrations i.e. the to-and-fro movement of the welding jaw 34 to a predetermined value after actuation of the DC-motor 36 by the actuation switch 54.

According to FIG. 3, the nut 104 associated with the bolt 74 serves to hold and pre-bias the plate or cup spring or spring means 76.

A more detailed description of the use of the afore-described connection apparatus 10 used in combination with the tensioning device 12 follows. After clamping the strap or band 16 in the vicinity of the innermost strap end 16' using the clamping element 20 of the tensioning device 12, the strap 16 is wrapped around the package or article 14 to be wrapped and, after insertion into the slot 22 of the slotted wheel 24, put under tension by actuation of the hand lever 26. Within the area under tension of the strap 16, the connecting apparatus 10 is slid under both the overlapping innermost strap end 16' and the outermost strap end 16" with the aid of the key head or wedge-shaped nose 82 so that these strap ends lie in the gap or space 32. By actuating the clamping lever 60 in the direction of the arrow 64, the clamping punch or stamp 78 is lowered onto the overlapping innermost end 16' and the outermost end 16" and there is thus actuated the DC-motor 36 before the full clamping force is achieved. When the full clamping force is reached, the welding jaw 34 grips the free lower or innermost strap end 16' and moves it or causes it to vibrate or oscillate a distance of about 1 millimeter transverse to the direction of the strap 16 against the upper or outermost strap end 16" which is held by the clamping surface or face 80 of the clamping punch or stamp 78. Both the innermost strap end or section 16' and the outermost strap end or section 16" are welded together by the resulting frictional heat. Simultaneous to the welding procedure, the cutter or knife 96 begins to sever or cut the upper or outermost strap end 16" lying directly adjacent to the weld spot or location. If the DC-motor 36 continues to run after severance or cutting of the outermost strap end 16", the innermost strap end 16' is not in danger of being severed or cut by the cutter or knife 96 which now rests upon it, because, as a result of the coupling of the cutter or knife 96 with the welding jaw 34, no relative motion results between the cutter or knife 96 and the innermost strap end 16'. The welding procedure is interrupted by the automatic deactuation of the DC-motor 36 caused by the time-deactuation or timing switch mounted on the conductor plate or board 52. The clamping lever 60 may only be released a short time period after the welding procedure has been interrupted in order to ensure that the weld or weld connection holds. For this purpose, a device or mechanism has been provided which is locked prior to operation of the connection apparatus 10 and afterwards must be released by hand.

The particular advantage of the inventive connection apparatus 10 is that it serves, in place of a seal clamp or pliers, for connecting overlapping strap or band ends of thermoplastic band material and does not require a connection to an electric power network. By welding within the area under tension, the length of strap used to apply tension lies outside the remaining length of strap on the package or article 14 wrapped, so that any eventual damage by a tensioning element, whether the slotted wheel or a friction wheel used to apply tension to the strap, is not a disadvantage or hindrance.

By attaching the connection apparatus 10 to a charging cable, continuous operation from an electric power or power supply network can be realized.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A connection apparatus for connecting overlapping ends of a strap formed of thermoplastic material tensioned about at least one article by a separate strap tensioning device, comprising:

a base plate;
   said base plate serving to support said connection apparatus at the at least one article to be wrapped with said strap;
   means defining a gap arranged above said base plate and serving for receiving overlapping portions of said strap;
   said gap defining means including a welding jaw;
   means for driving said welding jaw substantially transverse to a longitudinal axis of said overlapping ends of said strap;
   said driving means displacing said welding jaw with a to-and-fro oscillating motion which produces a frictional weld of said overlapping ends of said strap;
   clamping means defining a clamping surface located opposite and facing said welding jaw;
   said welding jaw being positioned in the vicinity of said base plate and substantially directly below said clamping surface;
   said welding jaw having a gripping surface;
   said gripping surface of said welding jaw facing upwards and acting upon a lowermost end of said overlapping ends of said strap;
   said gripping surface of said welding jaw and said clamping surface of said clamping means cooperating in producing said frictional weld of said overlapping ends of said strap during oscillation of said welding jaw relative to said clamping means;
   an actuation lever;
   a torsion spring cooperating with said actuation lever;
   said means defining a clamping surface located opposite to said welding jaw comprising a displaceable clamping punch;
   said displaceable clamping punch being actuatably lowerable in the direction of the welding jaw by means of said actuation lever against the force of said torsion spring;
an actuation switch for actuating said DC-motor;
said actuating lever comprising tripping means for tripping said actuation switch;
said tripping means being arranged so that said DC-motor is actuated before said overlapping ends of said strap are pressed together by said displaceable clamping punch;
a deactuation switch for counting a predetermined number of oscillating movements of said welding jaw;
said DC-motor including a current supply circuit; and
said deactuation switch being located in said current supply circuit of said DC-motor.

2. A connection apparatus for connecting overlapping ends of a strap formed of thermoplastic material tensioned about at least one article by a separate strap tensioning device, comprising:
a base plate;
said base plate serving to support said connection apparatus at the at least one article to be wrapped with said strap;
means defining a gap arranged above said base plate and serving for receiving overlapping portions of said strap;
said gap defining means including a welding jaw;
means for driving said welding jaw substantially transverse to a longitudinal axis of said overlapping ends of said strap;
said driving means displacing said welding jaw with a substantially linear to-and-fro oscillating motion which produces a frictional weld of said overlapping ends of said strap;
clamping means defining a clamping surface located opposite and facing said welding jaw;
said welding jaw being positioned in the vicinity of said base plate and substantially directly below said clamping surface;
said welding jaw having a gripping surface
said gripping surface of said welding jaw facing upwards and acting upon a lowermost end of said overlapping ends of said strap;
said gripping surface of said welding jaw and said clamping surface of said clamping means cooperating in producing said frictional weld of said overlapping ends of said strap during oscillation of said welding jaw relative to said clamping means;
an actuation lever;
a torsion spring constituting a return spring for said actuation lever in order to return said actuating lever into an inactive position;
said means defining a clamping surface located opposite to said welding jaw comprising a displaceable clamping punch;
said displaceable clamping punch being actuatably lowerable in the direction of the welding jaw by means of said actuation lever against the force of said torsion spring;
a cutter arranged at said clamping punch for severing an uppermost end of said strap;
means for coupling said cutter with said welding jaw such that operation of said cutter is essentially synchronous with said welding jaw located opposite and facing said clamping punch and such that said cutter moves with the same stroke as said welding jaw substantially transverse in said substantially linear to-and-fro oscillating motion relative to said overlapping ends of said strap;
said cutter being movable transversely and relative to said uppermost end of said strap and thereby severing said uppermost end of said strap; and
said cutter being movable conjointly with and non-severingly bearing upon said lowermost end of said strap during continued to-and-fro oscillating motion of said welding jaw after said uppermost end of said strap has been severed by said cutter.

3. The connection apparatus as defined in claim 2, further including:
a compression spring;
said compression spring holding said cutter under a pre-bias in a direction extending towards said uppermost end of the strap to be cut; and
said cutter being capable of being lowered conjointly with said clamping punch in the direction extending towards said uppermost end of the strap to be cut.

4. A portable connection apparatus for connecting overlapping ends of a strap formed of thermoplastic material tensioned about at least one article by a separate strap tensioning device, comprising:
a base plate;
said base plate serving to support said connection apparatus at the at least one article to be wrapped with said strap;
means defining a gap arranged above said base plate and serving for receiving overlapping portions of said strap;
said gap defining means including a welding jaw;
means for driving said welding jaw substantially transverse to a longitudinal axis of said overlapping ends of said strap;
said driving means displacing said welding jaw with a substantially linearly guided to-and-fro oscillating motion which produces a frictional weld of said overlapping ends of said strap;
guide means for the substantially frictionless guiding and supporting of said welding jaw against laterally directed forces acting upon said welding jaw as well as forces directed towards said welding jaw during production of said frictional weld;
clamping means defining a clamping surface located opposite and facing said welding jaw;
said welding jaw being positioned in the vicinity of said base plate and substantially directly below said clamping surface;
said welding jaw having a gripping surface;
said gripping surface of said welding jaw facing upwards and acting upon a lowermost end of said overlapping ends of said strap;
said gripping surface of said welding jaw and said clamping surface of said clamping means cooperating in producing said frictional weld of said overlapping ends of said strap during oscillation of said welding jaw relative to said clamping means;
an actuation lever;
a torsion spring constituting a return spring for said actuation lever in order to return said actuation lever into an inactive position;
said means defining a clamping surface located opposite to said welding jaw comprising a displaceable clamping punch;
said actuation lever constituting displacement means for lowering said displaceable clamping punch in the direction of the welding jaw against the force of said torsion spring;

a DC-motor constituting said driving means for imparting to said welding jaw said to-and-fro oscillating motion substantially transverse to said longitudinal axis of said overlapping ends of said strap;

an actuation switch for actuating said DC-motor;

said actuation lever comprising tripping means for tripping said actuation switch;

said displaceable clamping punch being lowered by said actuation lever through a clamping stroke for pressing together said overlapping ends of said strap;

said tripping means being arranged so that said DC-motor is actuated before the completion of said clamping stroke of said displaceable clamping punch for pressing together said overlapping ends of said strap;

a handle;

said handle being disposed substantially parallel to said actuation lever;

said handle housing said actuation switch and a battery means for supplying power to said DC-motor; and said handle and said actuation lever lying substantially perpendicular to said longitudinal axis of said overlapping ends of the strap.

5. A connection apparatus for connecting overlapping ends of a strap formed of thermoplastic material tensioned about at least one article by a separate strap tensioning device, comprising:

a said plate;

said base plate serving to support said connection apparatus at the at least one article to be wrapped with said strap;

means defining a gap arranged above said base plate and serving for receiving overlapping portions of said strap;

said gap defining means including a welding jaw;

means for driving said welding jaw substantially transverse to a longitudinal axis of said overlapping ends of said strap;

said driving means displacing said welding jaw with a to-and-fro oscillating motion which produces a frictional weld of said overlapping ends of said strap;

clamping means defining a clamping surface located opposite and facing said welding jaw;

said welding jaw being positioned in the vicinity of said base plate and substantially directly below said clamping surface;

said welding jaw having a gripping surface;

said gripping surface of said welding jaw facing upwards and acting upon a lowermost end of said overlapping ends of said strap;

said gripping surface of said welding jaw and said clamping surface of said clamping means cooperating in producing said frictional weld of said overlapping ends of said strap during oscillation of said welding jaw relative to said clamping means;

a cutter;

means for coupling said cutter with said welding jaw such that operation of said cutter is essentially synchronous with said welding jaw located opposite and facing said clamping means and such that said cutter moves with the same stroke as said welding jaw substantially transverse in said to-and-fro oscillating motion relative to said overlapping ends of said strap; and said cutter being coupled to said clamping means in order to sever an uppermost end of said strap.

6. The connection apparatus as defined in claim 5, further including:

a compression spring;

said compression spring holding said cutter under a pre-bias in a direction extending towards said uppermost end of the strap to be cut;

said clamping means comprising a clamping punch; and said cutter being capable of being lowered conjointly with said clamping punch in the direction extending towards said uppermost end of the strap to be cut.

7. A connection apparatus for connecting overlapping ends of a strap formed of thermoplastic material tensioned about at least one article by a separate strap tensioning device, comprising:

a base plate;

said base plate serving to support said connection apparatus at the at least one article to be wrapped with said strap;

means defining a gap arranged above said base plate and serving for receiving overlapping portions of said strap;

said gap defining means including a welding jaw;

means for driving said welding jaw substantially transverse to a longitudinal axis of said overlapping ends of said strap;

said driving means displacing said welding jaw with a to-and-fro oscillating motion which produces a frictional weld of said overlapping ends of said strap;

clamping means defining a clamping surface located opposite and facing said welding jaw;

said welding jaw being positioned in the vicinity of said base plate and substantially directly below said clamping surface;

said welding jaw having a gripping surface;

said gripping surface of said welding jaw facing upwards and acting upon a lowermost end of said overlapping ends of said strap;

said gripping surface of said welding jaw and said clamping surface of said clamping means cooperating in producing said frictional weld of said overlapping ends of said strap during oscillation of said welding jaw relative to said clamping means;

a cutter;

means for coupling said cutter with said welding jaw such that operation of said cutter is essentially synchronous with said welding jaw located opposite and facing said clamping means and such that said cutter moves with the same stroke as said welding jaw substantially transverse in said to-and-fro oscillating motion relative to said overlapping ends of said strap; and said cutter being movable transversely and relative to an uppermost end of said strap and thereby severing said uppermost end of said strap.

8. The connection apparatus as defined in claim 7, further including:

a compression spring;

said compression spring holding said cutter under a pre-bias in a direction extending towards said uppermost end of the strap to be cut;

said clamping means comprising a clamping punch; and said cutter being capable of being lowered conjointly with said clamping punch in the direction extending towards said uppermost end of the strap to be cut.

* * * * *